(12) United States Patent
Wilson

(10) Patent No.: US 10,531,678 B2
(45) Date of Patent: Jan. 14, 2020

(54) PACKAGING SYSTEM FOR DELIVERING CONSISTENT SERVING SIZES OF HARD ICE CREAM

(71) Applicant: Lesley R. Wilson, Schoolcraft, MI (US)

(72) Inventor: Lesley R. Wilson, Schoolcraft, MI (US)

(*) Notice: Subject to any disclaimer, the term of this patent is extended or adjusted under 35 U.S.C. 154(b) by 283 days.

(21) Appl. No.: 15/716,820

(22) Filed: Sep. 27, 2017

(65) Prior Publication Data

US 2018/0132505 A1    May 17, 2018

Related U.S. Application Data

(60) Provisional application No. 62/497,185, filed on Nov. 14, 2016.

(51) Int. Cl.
| | | |
|---|---|---|
| *A23G 9/28* | (2006.01) | |
| *B65D 85/78* | (2006.01) | |
| *B65B 9/04* | (2006.01) | |
| *B29C 65/18* | (2006.01) | |
| *B65B 31/02* | (2006.01) | |

(52) U.S. Cl.
CPC ............ *A23G 9/28* (2013.01); *B65B 9/045* (2013.01); *B65D 85/78* (2013.01); *B29C 65/18* (2013.01); *B65B 31/021* (2013.01)

(58) Field of Classification Search
CPC ....... B65B 31/021; B65B 9/045; B29C 65/18; A23G 9/28
USPC ......................................................... 53/428
See application file for complete search history.

(56) References Cited

U.S. PATENT DOCUMENTS

| | | | | |
|---|---|---|---|---|
| 2,156,466 | A | | 5/1939 | Vogt |
| 2,447,258 | A | * | 8/1948 | Lobley ............... B65B 9/02 53/428 |
| 3,184,895 | A | | 5/1965 | O'Connor |
| 3,597,899 | A | * | 8/1971 | Hanson .............. B29C 51/267 53/556 |
| 3,809,774 | A | * | 5/1974 | Raitt ..................... A23G 9/14 426/393 |
| 3,817,422 | A | * | 6/1974 | Raitt ..................... A23G 9/28 221/74 |
| 3,871,155 | A | | 3/1975 | Blaser |
| 4,223,043 | A | | 9/1980 | Johnson |
| 4,767,307 | A | * | 8/1988 | Beer .................... A23G 9/083 425/394 |
| D517,103 | S | * | 3/2006 | Ribeiro ................... D15/90 |
| 7,052,727 | B2 | | 5/2006 | Franklin et al. |
| 9,027,567 | B2 | | 5/2015 | Gee et al. |
| 2005/0233033 | A1 | * | 10/2005 | Marchon ............. A23G 9/28 426/101 |
| 2010/0168074 | A1 | | 7/2010 | Culligan et al. |
| 2013/0126548 | A1 | | 5/2013 | Pourian et al. |

(Continued)

*Primary Examiner* — Robert F Long
*Assistant Examiner* — Xavier A Madison
(74) *Attorney, Agent, or Firm* — Price Heneveld LLP

(57) ABSTRACT

A package for a frozen food includes a plurality of spherically-shaped portions of hard ice cream. A first sealing member at least partially conforms to the shape of each spherical portion of the plurality of spherically-shaped portions. A second sealing member is adhered to the first sealing member. The first and second sealing members cooperatively form a plurality of storage cavities. Each storage cavity selectively encloses a corresponding spherical portion of the plurality of spherically-shaped portions, wherein each corresponding spherical portion includes a concave depression.

9 Claims, 7 Drawing Sheets

(56) References Cited

U.S. PATENT DOCUMENTS

2016/0143311 A1 5/2016 Dhadda et al.
2016/0200501 A1 7/2016 Lee et al.

* cited by examiner

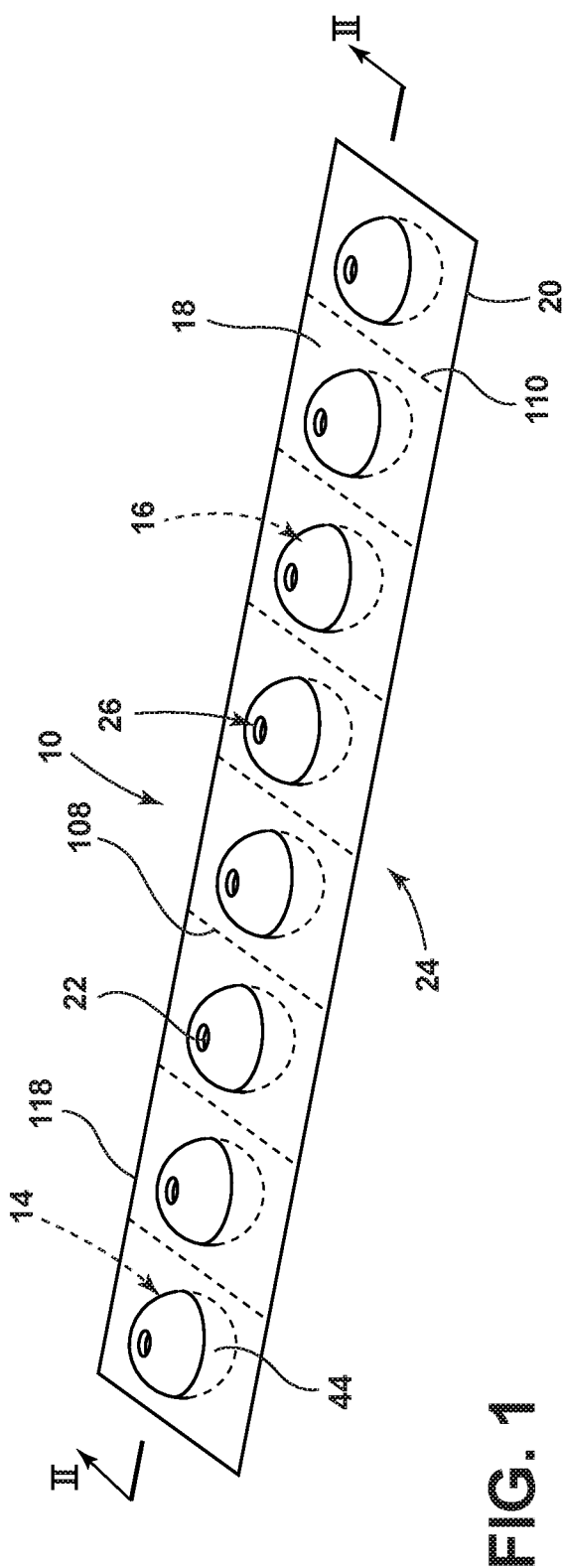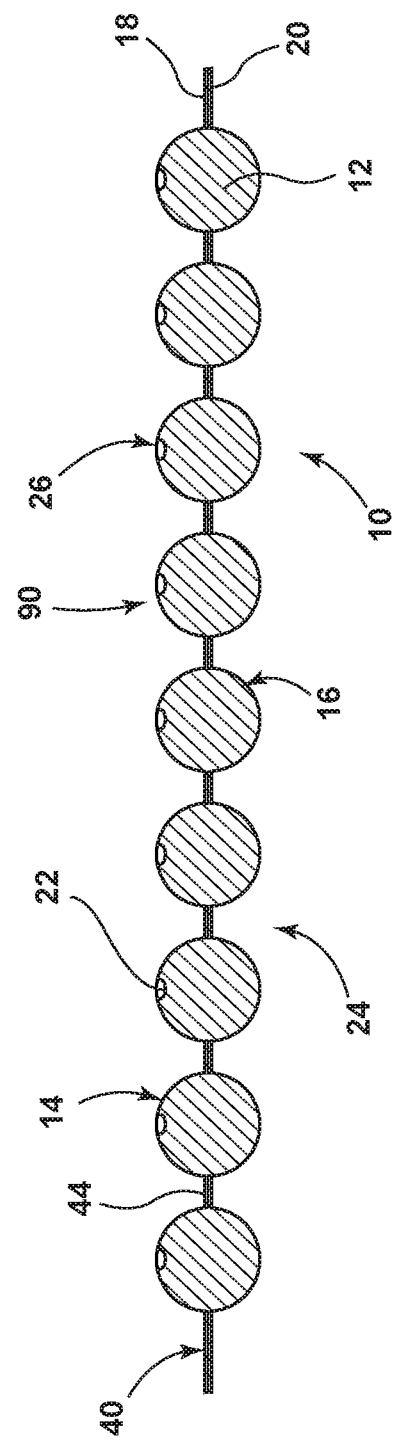

PACKAGING SYSTEM FOR DELIVERING CONSISTENT SERVING SIZES OF HARD ICE CREAM

CROSS-REFERENCE TO RELATED APPLICATION

This application claims priority to and the benefit under 35 U.S.C. § 119(e) of U.S. Provisional Patent Application No. 62/497,185 filed on Nov. 14, 2016, entitled "SCOOP-LESS™ ICE CREAM," the entire disclosure of which is hereby incorporated herein by reference.

FIELD OF THE INVENTION

The present invention generally relates to packaging for servings of hard ice cream, and more specifically, a packaging system for providing consistently sized spheres of hard ice cream that are separated into individual compartments within the packaging system.

BACKGROUND OF THE INVENTION

Providing servings of hard ice cream typically includes hand dipping ice cream from a large container and placing the dipped rolls of hard ice cream within a separate container. The rolls of hard ice cream are difficult to obtain in consistent sizes and significant effort can be required to hand dip ice cream from the large container.

SUMMARY OF THE INVENTION

According to one aspect of the present invention, a package for a frozen food includes a plurality of spherically-shaped portions of hard ice cream. A first sealing member at least partially conforms to the shape of each spherical portion of the plurality of spherically-shaped portions. A second sealing member is adhered to the first sealing member. The first and second sealing members cooperatively form a plurality of storage cavities. Each storage cavity selectively encloses a corresponding spherical portion of the plurality of spherically-shaped portions, wherein each corresponding spherical portion includes a concave depression.

According to another aspect of the present invention, a method of placing hard ice cream into a container includes disposing at least one sphere of hard ice cream onto a first sealing member. A second sealing member is pressed onto the first sealing member and at least partially around the at least one sphere of hard ice cream to define a separate storage cavity for each at least one sphere of hard ice cream. The first and second sealing members are sealed together around each at least one sphere of hard ice cream to define a sealed strand, wherein the first and second sealing members are releasable. Each at least one sphere of hard ice cream is indented to define a concave depression within each at least one sphere of hard ice cream. The first and second sealing members are placed into an outer container.

According to another aspect of the present invention, a method of placing hard ice cream into a container includes disposing at least one sphere of hard ice cream within a tube that includes first and second sealing members. At least one of the first and second sealing members includes a plurality of perforations. The second sealing member is pressed onto the first sealing member and at least partially around the at least one sphere of hard ice cream to define a separate storage cavity for each at least one sphere of hard ice cream. The plurality of perforations includes a respective perforation that corresponds to a respective storage cavity. The first and second sealing members are sealed together around each at least one sphere of hard ice cream to define a sealed strand. The first and second sealing members are releasable. Each at least one sphere of hard ice cream is indented to define a concave depression within each at least one sphere of hard ice cream.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of the ice cream packaging system containing a plurality of spheres of hard ice cream contained therein;

FIG. 2 is a cross-sectional view of the packaging system of FIG. 1 taken along II-II;

DETAILED DESCRIPTION OF THE PREFERRED EMBODIMENTS

Figure 3:
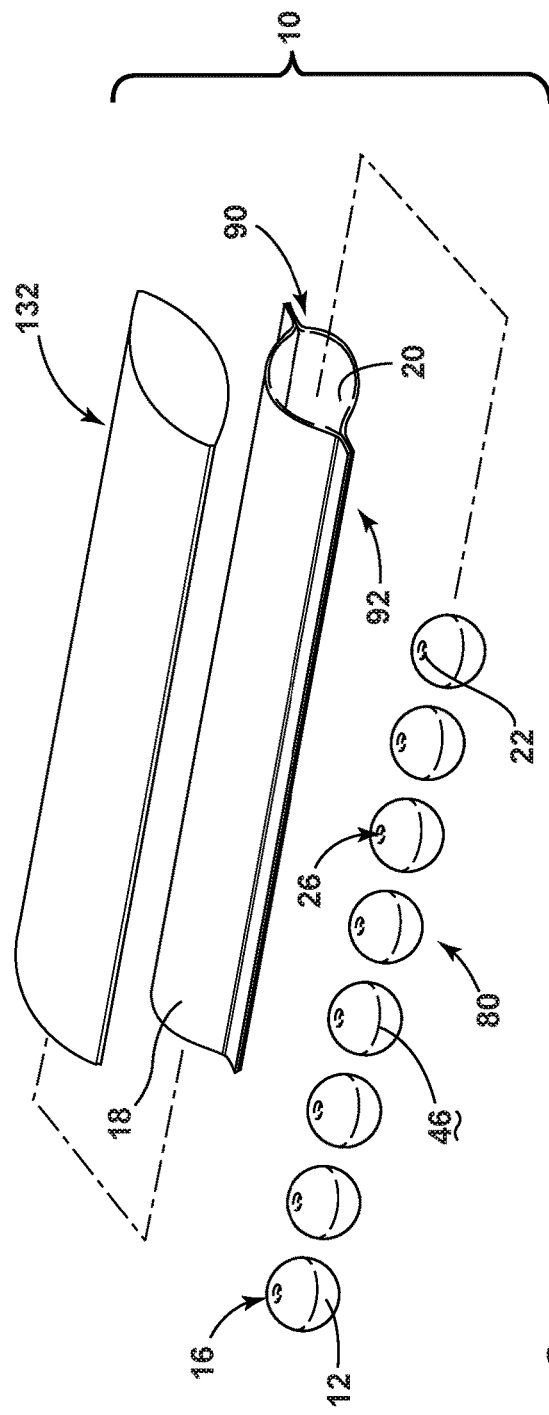
FIG. 3 is a partially exploded perspective view of an aspect of a packaging system where spheres of hard ice cream are disposed within a tube-shaped container.
Figure 4:
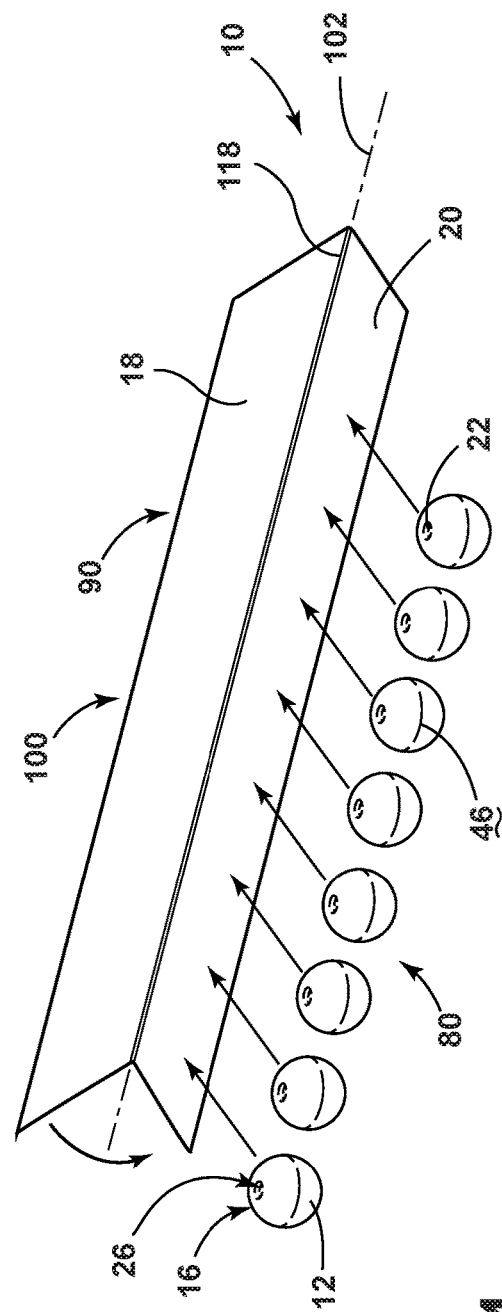
FIG. 4 is a partially-exploded perspective view of an aspect of the packaging system where the spheres of ice cream are disposed within a folded member that forms the packaging system.
Figure 5:
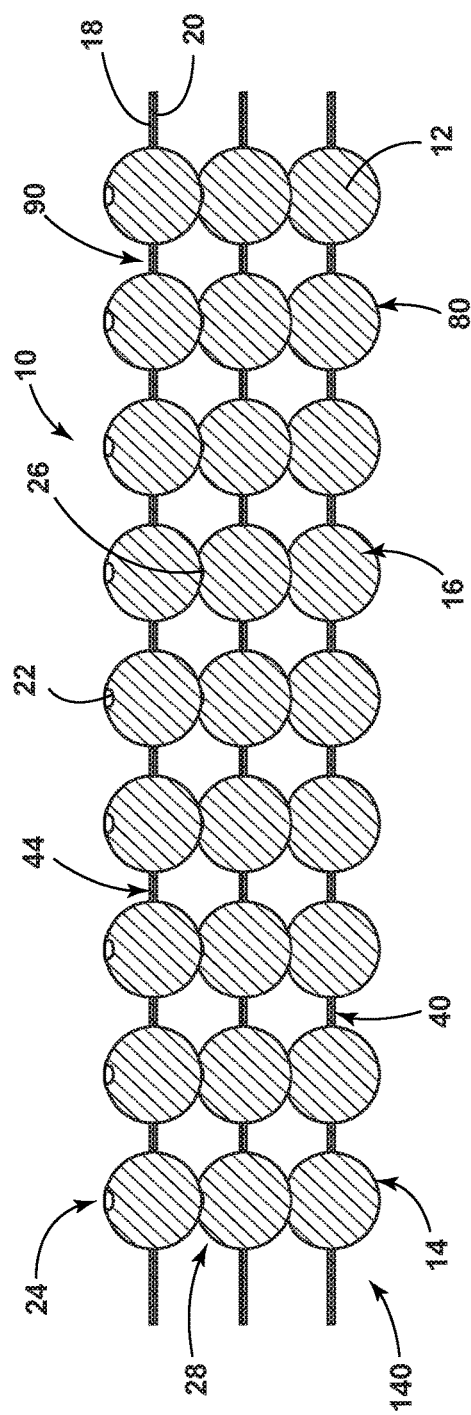
FIG. 5 is a schematic cross-sectional view of a plurality of packaging systems stacked on top of one another and illustrating the use of the concave depression of each sphere.
Figure 6:
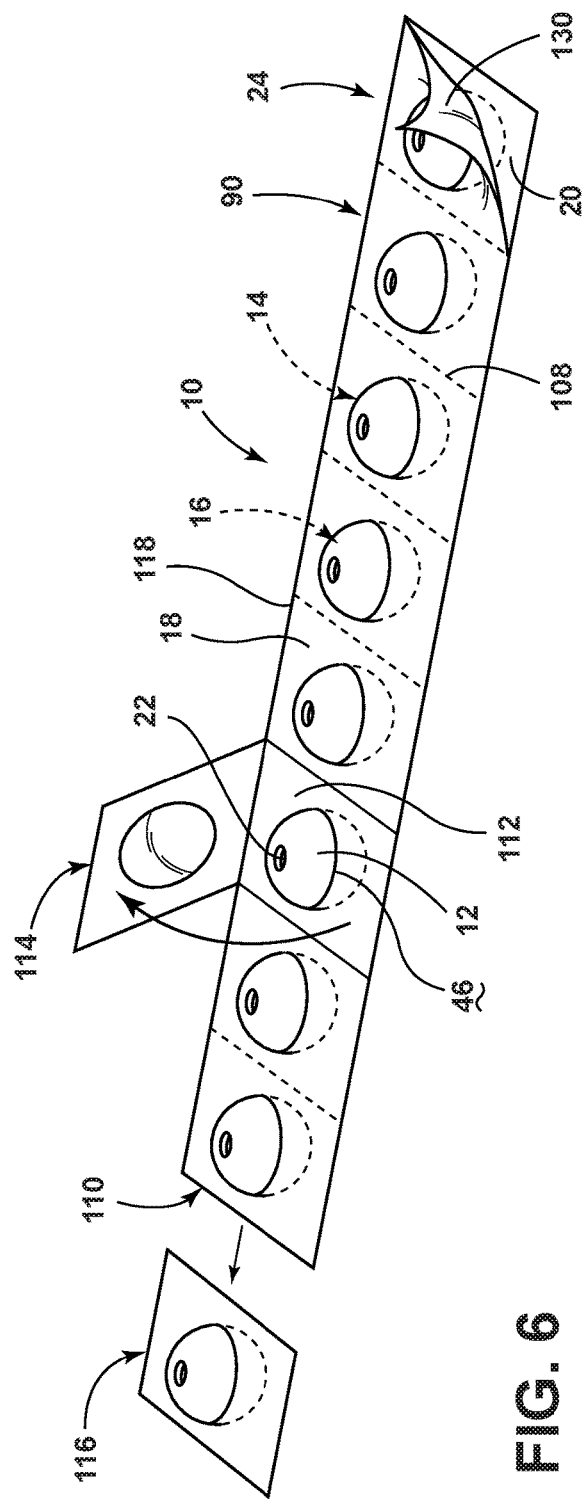
FIG. 6 is a top perspective view of an aspect of the packaging system showing multiple operating methods for accessing the spheres of hard ice cream.
Figure 7:
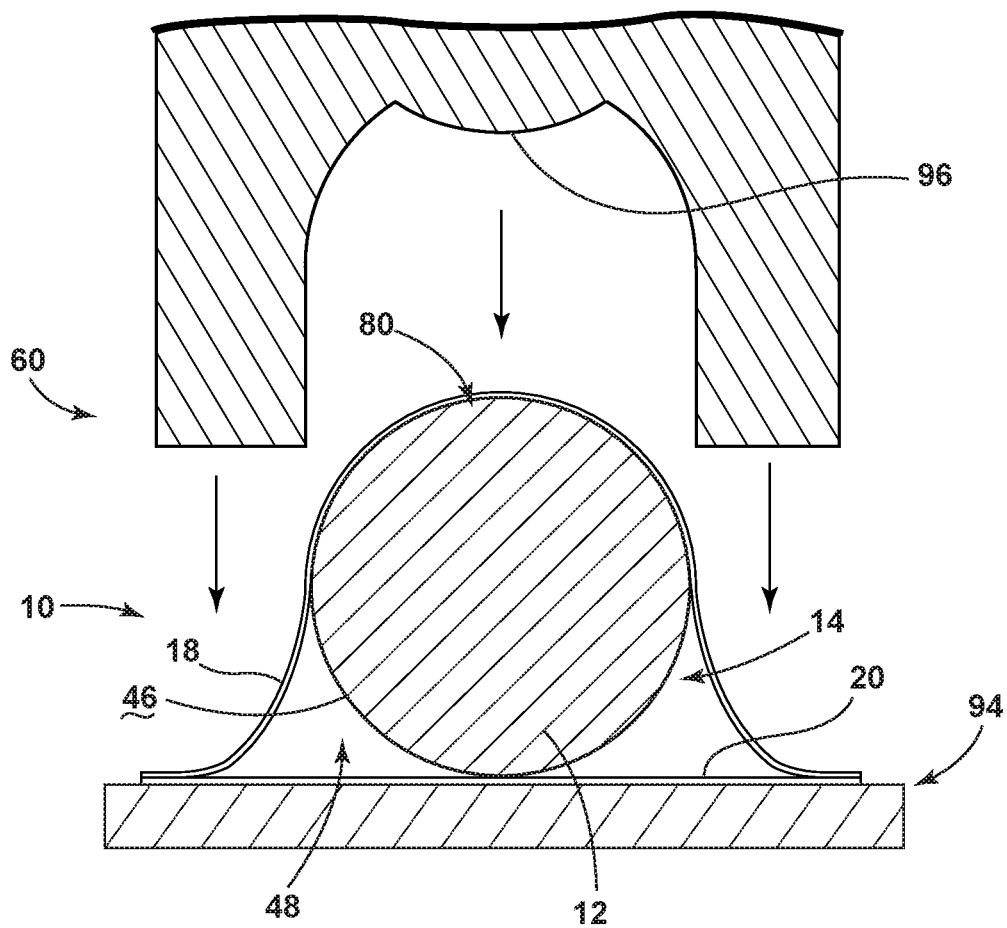
FIG. 7 is a schematic cross-sectional view of a pressing mechanism moving downward to form a storage cavity around respective spheres of ice cream.
Figure 8:
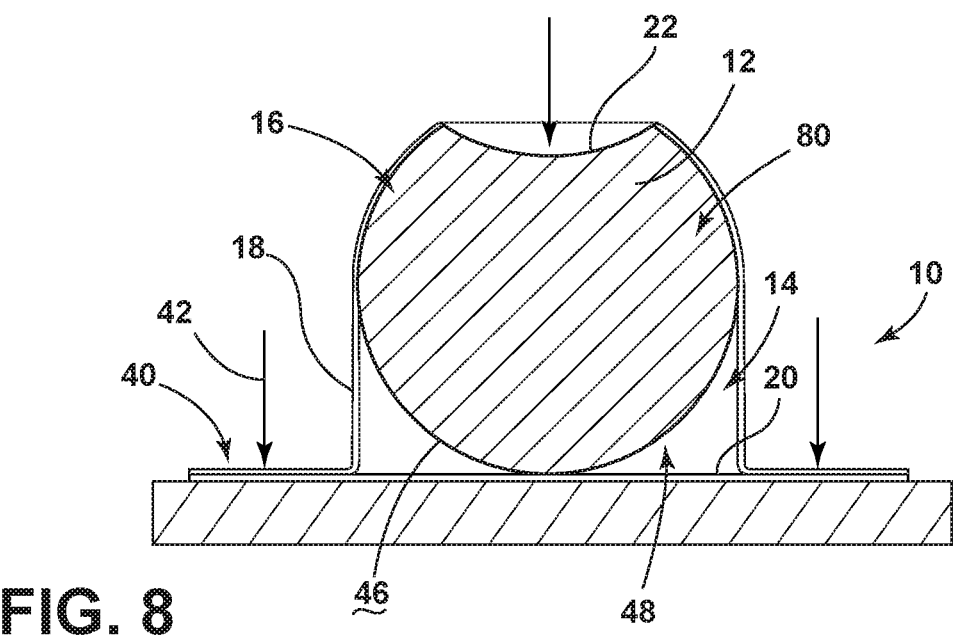
FIG. 8 is a schematic cross-sectional view of a storage cavity of the packaging system and illustrating formation of the concave depression within the spheres of hard ice cream.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-8, reference numeral 10 generally refers to a packaging system for storing individual and consistently sized and shaped portions 16 of hard ice cream 12. The packaging system 10 includes multiple compartments or storage cavities that can be collectively or individually accessed for providing consistent serving size 80 of hard ice cream 12 that can be used for individual consumption or use within a recipe incorporating servings of hard ice cream 12. While hard ice cream 12 is disclosed, the packaging system 10 can be used for various food items, typically, frozen food items. According to various aspects of the device, the packaging system 10 for various frozen foods includes a plurality of spherically-shaped portions of hard ice cream 12. A first sealing member 18 engages the plurality of spherically-shaped portions of hard ice cream 12 and at least partially conforms to the shape of each shaped portion 16 of the hard ice cream 12. A second sealing member 20 is adhered to the first sealing member 18. In this manner, the first and second sealing members 18, 20 cooperatively form a plurality of storage cavities 14. Each storage cavity 14 selectively encloses a corresponding shaped portion 16 of the plurality of spherically-shaped portions of hard ice cream 12. Within each shaped portion 16 of hard ice cream 12, a concave depression 22 is defined therein. The use of a concave depression 22 within the shaped portion 16 of hard ice cream 12 assists in layering of numerous sealed strands 24 of hard ice cream 12 and also for stacking the individual spherically-shaped portions of hard ice cream 12. As will be described more fully below, the concave depression 22 serves as a support, such as a seat 26, for a vertically adjacent spherically-shaped portion 28 of hard ice cream 12 when stacked for serving and consumption or when stacked as part of the packaging system 10.

According to various aspects of the device, the use of shaped portions 16 of hard ice cream 12 provides for the consistent shape of the spheres of frozen food being used within the packaging system 10. Hard ice cream 12 typically includes greater quantities of milk and milk fat. Hard ice cream 12 is typically produced at a lower temperature than other frozen confections such as soft ice cream. These factors and considerations make the hard ice cream 12 and similar products such as gelato more dense and able to hold a consistent shape for packaging. One advantage of using the packaging system 10 disclosed herein is that the hard ice cream 12 can be maintained at a significantly cold temperature while not impeding the ability of the user to access a serving of hard ice cream 12.

In conventional containers of ice cream, the user typically maintains a large container of hard ice cream 12 at a warmer temperature so that the hard ice cream 12 is softened and can be dipped using an ice cream scoop. Alternatively, a user may leave a large container of ice cream outside of a freezing environment to warm the ice cream so that it can be more convenient to hand dip the hard ice cream 12. The use of the packaging system 10 for providing spherically-shaped portions of hard ice cream 12 addresses these issues of conventional packaging by providing a Scoopless™ form of hard ice cream 12. Stated another way, spherically-shaped portions of hard ice cream 12 are preformed into servings that can be accessed by manipulating the packaging system 10 for accessing one or more of the shaped portions 16 of hard ice cream 12. Because the hard ice cream 12 can be kept at a colder temperature, there is no need to warm the hard ice cream 12 for accessing each shaped portion 16 of hard ice cream 12. Using the packaging system 10 described herein, the spherically-shaped portions of hard ice cream 12 can be kept at a significantly colder temperature and maintained at that temperature until such time as a shaped portion 16 of hard ice cream 12 needs to be removed from the packaging system 10. The remaining shaped portions 16 within the packaging system 10 can be kept within the packaging system 10 and inside of the freezing environment until such time as additional shaped portions 16 of hard ice cream 12 are needed for consumption or other use in preparing a food item. By keeping the shaped portions 16 of hard ice cream 12 within the packaging system 10 in a consistently cold environment, the shaped portions 16 of hard ice cream 12 do not experience substantial temperature fluctuations that might cause crystallization of outer portions of the hard ice cream 12 that are commonly referred to as "freezer burn" of the hard ice cream 12. The shaped portions 16 of hard ice cream 12 can be removed from the packaging system 10 and removed to a warmer environment only when needed to be used for consumption or use in preparing a particular food item. In this manner, the integrity of each shaped portion 16 of hard ice cream 12 can be maintained. The ability of the packaging system 10 to provide for the shaped portions 16 of hard ice cream 12 to be maintained at a substantially consistent temperature provides this integrity of the shaped portions 16 before, during and after the packaging of the shaped portions 16.

Referring again to FIGS. 1-8, the packaging system 10 can include the first and second sealing members 18, 20 that are engaged with one another to form a substantially air-tight seal 40 around each of the plurality of storage cavities 14 that contain a respective shaped portion 16 of hard ice cream 12 therein. According to various aspects of the device, the first and second sealing members 18, 20 can be in the form of a wax-based material that can be sealed together to form the various storage cavities 14 within the packaging system 10. The first and second sealing members 18, 20 can also take the form of one or more pressure-sensitive members that form a sealing bond between the first and second sealing members 18, 20 when a pressure 42 is applied to one or both of the first and second sealing members 18, 20. It is also contemplated that the first and second sealing members 18, 20 can include a heat-sensitive material that can form a substantially air-tight seal 40 when localized heat is applied around the boundary 44 of each storage cavity 14. The first and second sealing members 18, 20 can also be bonded together using an electrical current that passes through the first and second sealing members 18, 20. In such an embodiment, the resistance of the material may generate a small amount of heat when the electrical current is passed therethrough. This small amount of heat can serve to bond the first and second sealing members 18, 20 together at each boundary 44 of the various storage cavities 14 to form the various storage cavities of the packaging system 10. It is contemplated that the air-tight seal 40 generated between the first and second sealing members 18, 20 is a releasable seal. In this manner, the first and second sealing members 18, 20 can be detached from one another to release the contents of a particular storage cavity 14 for accessing and removing a shaped portion 16 of hard ice cream 12 for use. Typically, once the air-tight seal 40 between the first and second sealing members 18, 20 is disengaged, they are not able to be reengaged. In each of the various embodiments of the packaging system 10, the first and second sealing members 18, 20 cooperate to define a substantially air-tight seal 40 around each storage cavity 14.

According to various aspects of the device, the first and second sealing members 18, 20 will form the storage cavity 14 around the spherical portion of hard ice cream 12. Where each storage cavity 14 is not pressurized or made subject to a vacuum-pressurized environment, the first and second sealing members 18, 20 may be configured to only partially engage an outer surface 46 of each shaped portion 16 of hard ice cream 12. In various aspects of the device, where a vacuum is applied to each storage cavity 14, first and second sealing members 18, 20 can be made to substantially conform to the shape of the outer surface 46 of each shaped portion 16 of hard ice cream 12. Typically, air 48 or other similar gas will remain within the storage cavity 14 along with the spherical portion of hard ice cream 12. In this manner, the air 48 can assist in providing cushioning between various packaging systems 10 or sealed strands 24 of hard ice cream 12 that may be stacked on top of one another and adjacent to one another.

Referring again to FIGS. 1-8, the shaped portion 16 of hard ice cream 12 is typically an approximately four inch diameter sphere having the concave depression 22 formed therein. The concave depression 22 within the shaped portion 16 of hard ice cream 12 can be formed during formation of the shaped portion 16. The concave depression 22 can also be defined within the shaped portion 16 during a pressing operation 60 that adheres or otherwise attaches the first and second sealing members 18, 20 together. As discussed previously, the concave depression 22 is configured to receive a vertically-adjacent shaped portion 16 of hard ice cream 12 that may be removed from the packaging system 10 or may be in the form of another sealed strand 24 of the packaging system 10 placed on top of a set of shaped portions 16 placed within another sealed strand 24 of the packaging system 10.

Figure 9:
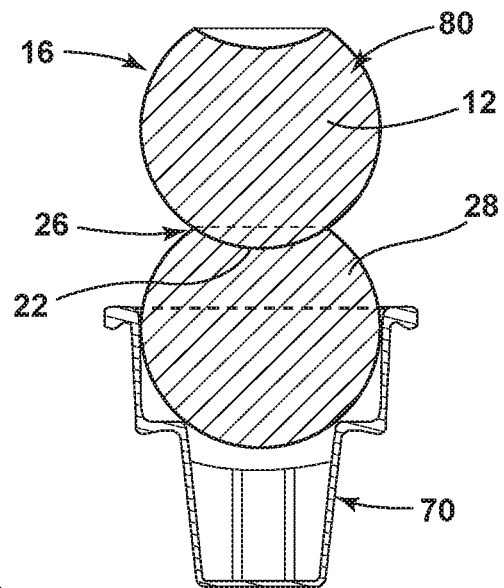
FIG. 9 is a schematic cross-sectional representation of a plurality of spheres of ice cream disposed within an edible container for individual consumption.

As exemplified in FIG. 9, the concave depression 22 provides a seat 26 within which a vertically adjacent spherical portion of hard ice cream 12 can be placed. The vertically adjacent shaped portion 28 can be balanced within the concave depression 22 of a lower and vertically adjacent shaped portion 28. By providing this stacking functionality, the shaped portions 16 of hard ice cream 12 having concave depression 22 provide for an efficient and convenient mechanism for stacking shaped portions 16 of hard ice cream 12 within a cone 70, dish, or other serving apparatus. The use of a packaging system 10 can provide for shaped portions 16 of hard ice cream 12 that can save significant time and resources in providing servings of hard ice cream 12 to consumers. The use of the shaped portions 16 of hard ice cream 12 also substantially eliminates the need to hand dip or scoop individual scoops of hard ice cream 12 from a large carton of hard ice cream 12. This functionality can greatly decrease the amount of effort necessary to serve hard ice cream 12 to consumers or within a household setting.

Figure 10:
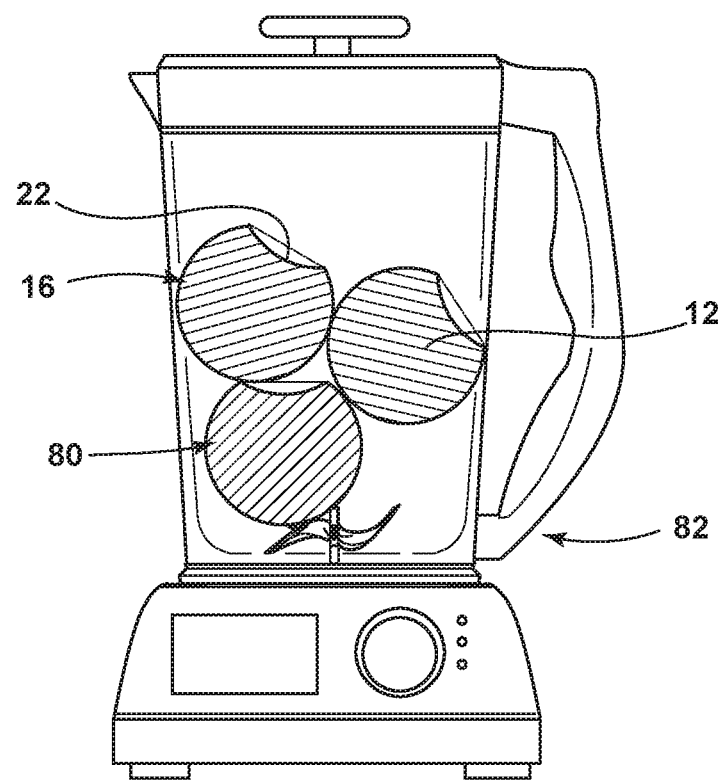
FIG. 10 is a schematic illustration showing placement of multiple spheres of hard ice cream disposed within a food processing appliance.
Figure 11:
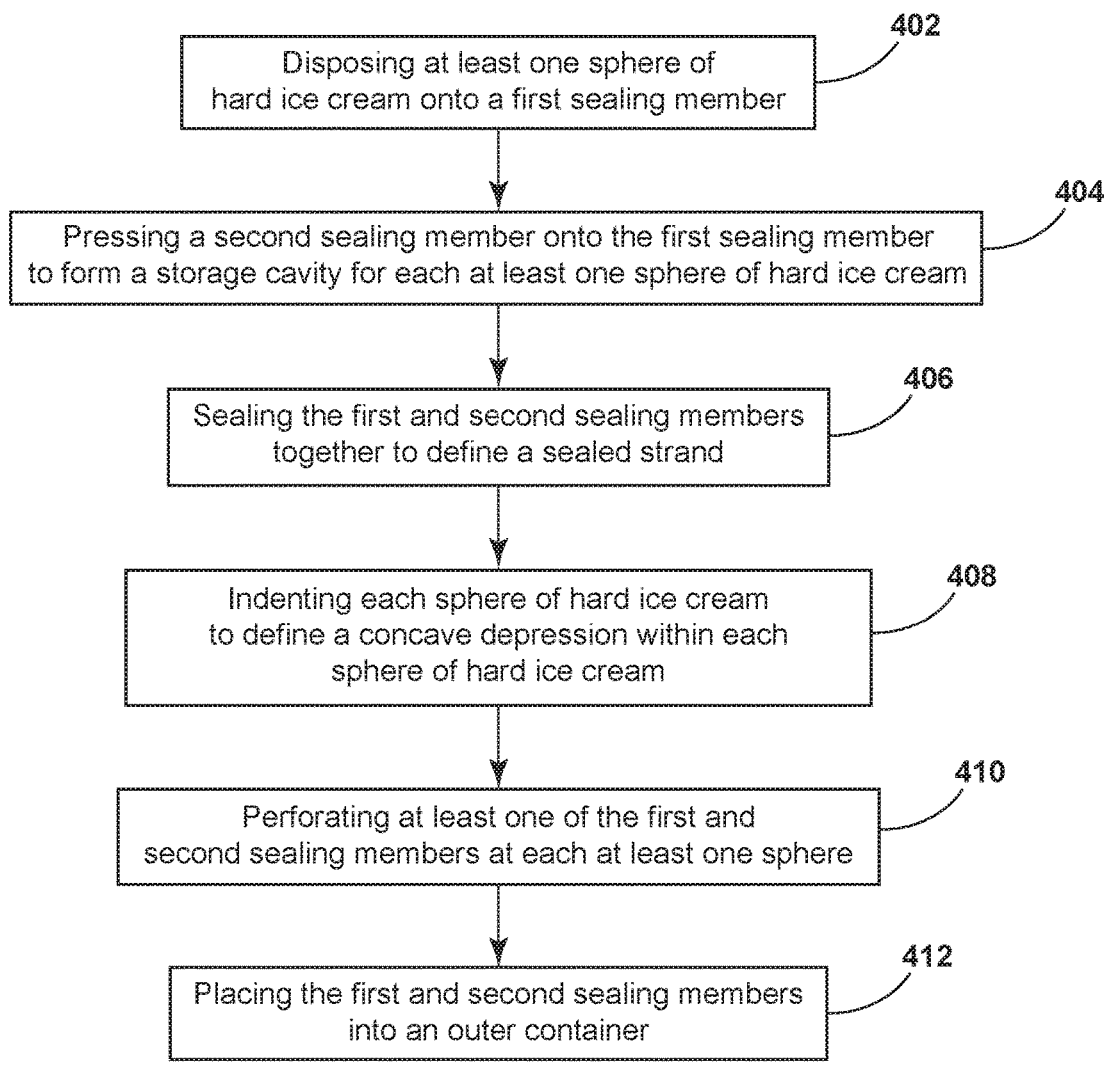
FIG. 11 is a linear flow diagram illustrating a method of placing spheres of hard ice cream into a packaging container.
Figure 12:
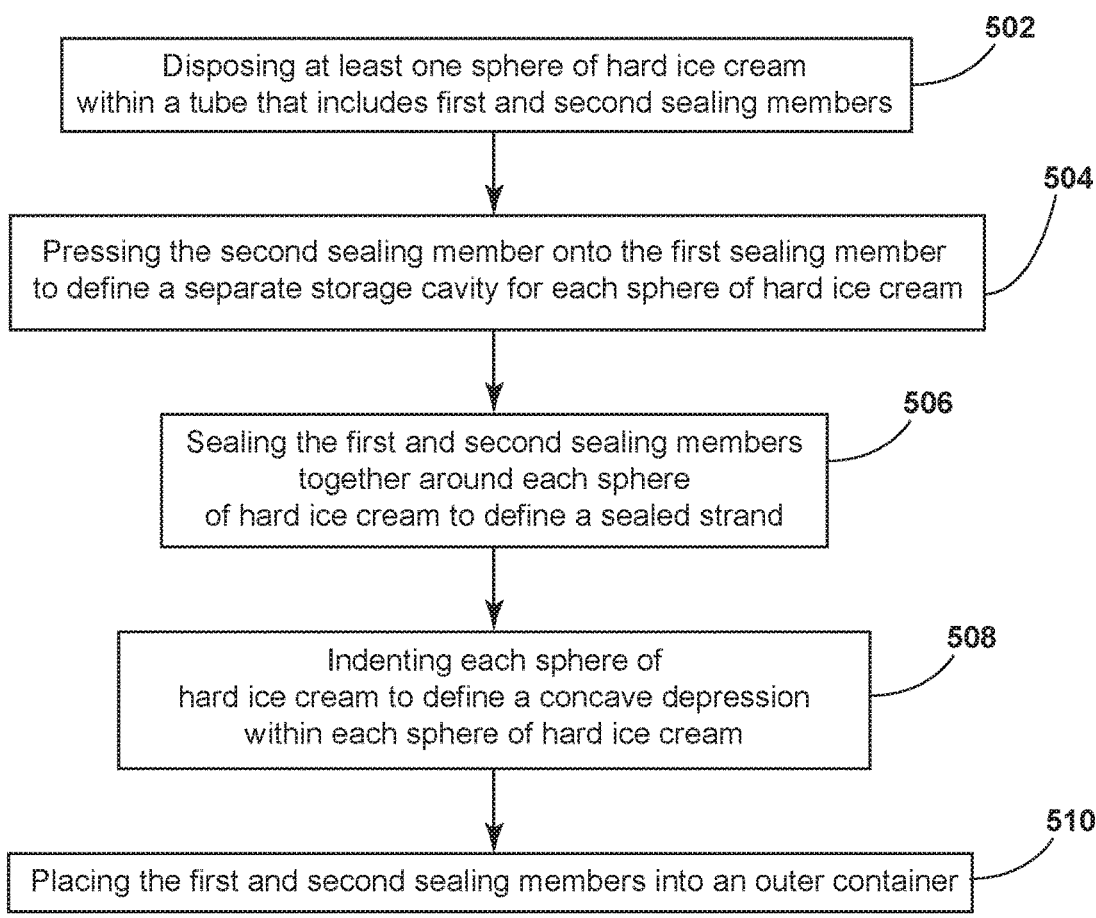
FIG. 12 is a linear flow diagram illustrating a method for placing spheres of hard ice cream into a packaging container.

Referring now to FIG. 10, the packaging system 10 disclosed herein also provides a consistent serving size 80 within the various shaped portions 16 of hard ice cream 12. According to various aspects of the device, the shaped portions 16 of hard ice cream 12 will be in the form of an approximately four inch diameter sphere. According to this serving size 80, approximately sixteen shaped portions 16 of hard ice cream 12 can be combined together to measure approximately one-half gallon of hard ice cream 12 for packaging. By providing a consistent serving size 80 within the shaped portion 16 of hard ice cream 12, measurement of serving sizes 80 is no longer necessary. In the case of a smoothie or other recipe that is processed within a food processing appliance 82 as exemplified in FIG. 10, a pre-set number of shaped portions 16 of hard ice cream 12 can be used within a particular recipe. The use of the shaped portions 16 of hard ice cream 12 serves to greatly eliminate waste and make the process of serving hard ice cream 12 to consumers a more efficient and cost effective process. It should be appreciated that shaped portions 16 of hard ice cream 12 having larger and smaller sizes can be utilized within the packaging system 10. Additionally, in various embodiments of the device, various sizes of shaped portions 16 of hard ice cream 12 can be included within a single aspect of the packaging system 10.

While spherically-shaped portions of hard ice cream 12 are exemplified in the figures, other configurations of the shaped portions 16 can also be used. Such configurations can include, but are not limited to, cuboidal, oblong, cylindrical, conical, polygonal, irregular, various tessellated or honeycomb-type shapes, combinations thereof and other similar configurations of the shaped portions 16 of hard ice cream 12.

Referring again to FIGS. 1-8, to form the shaped portions 16 of hard ice cream 12, various processes can be used. In at least one aspect of the device, hard ice cream 12 from a large container can be injected into various forms that define the desired shape of the shaped portions 16 of hard ice cream 12. These forms can be used to receive the hard ice cream 12 from the large container and also can be configured to compress the hard ice cream 12 into the approximately four inch diameter spherically-shaped portions of hard ice cream 12. According to various aspects of the device, the forms can be in the form of a silicone mold that can have a substantially flexible portion. The flexible portion of the silicone mold can be used to remove the spherical portion of hard ice cream 12 from the mold.

According to various aspects of the device, various assembly line techniques known in the art can be used to apportion servings of ice cream that can then be formed into the spherical portions of hard ice cream 12. These shaped portions 16 of hard ice cream 12 can then be delivered to a separate area for incorporation within an aspect of the packaging system 10.

In forming the wrapper 90 of the packaging system 10, the first and second sealing members 18, 20 can be coupled together to define a tube shaped or cylindrical container 92 that includes each storage cavity 14. The cylindrical container 92 can be placed in an open configuration and the shaped portions 16 of hard ice cream 12 can be disposed therein in a predetermined configuration that corresponds to the boundaries of each storage cavity 14 within the packaging system 10. In various aspects of the device, the concave depression 22 defined within each shaped portion 16 can be placed in a downward configuration to prevent rolling of the shaped portion 16 with respect to the wrapper 90 defined by the first and second sealing members 18, 20. Additionally, in various aspects of the device, a platform 94 that includes a series of protrusions 96 can be used to align the concave depressions 22 on each protrusion for placing the shaped portions 16 of hard ice cream 12 in the appropriate location relative to the wrapper 90 formed by the first and second sealing members 18, 20.

In various aspects of the device, the first and second sealing members 18, 20 can be defined by a single continuous sheet 100 of material that is folded along an axis 102. In such an embodiment, the first and second sealing members 18, 20 are divided by the axis 102 of the continuous sheet 100 of material. When the first and second sealing members 18, 20 are folded over one another, a sealing process can serve to define the air-tight seal 40 of the first and second sealing members 18, 20. This process is used to define the storage cavities for containing the shaped portions 16 of hard ice cream 12.

As exemplified in FIGS. 1-8, during formation of the storage cavities 14, at least one of the first and second sealing members 18, 20 can include perforations 108, such that each storage cavity 14 includes at least one perforated edge 110. In various aspects of the device, the perforated edge 110 can extend through each of the first and second sealing members 18, 20. In this embodiment, the user can detach an entire storage cavity 14 from the packaging system 10 and can carry the enclosed shaped portion 16 of hard ice cream 12 within the storage cavity 14 to a separate location for use. In various aspects of the device, the various perforated edges 110 can be defined within only one of the first and second sealing members 18, 20. In such an embodiment, the other of the first and second sealing members 18, 20 can serve to define a continuous and non-perforated member 112. In such an embodiment, when a user desires to access one of the storage cavities 14, the user can separate the first sealing member 18 from the second sealing member 20 along the perforated edge 110 defined within the first sealing member 18. The first sealing member 18 can be lifted up into an unsealed state 114, as exemplified in FIG. 6. The shaped portion 16 can be removed and the removed portion 116 of the first sealing member 18 remains attached to the second sealing member 20. In this embodiment, it is contemplated that the first and second sealing members 18, 20 can include a fastening edge 118 that is free of perforations 108 and which maintains engagement of the entire first sealing member 18 and second sealing member 20. This engagement can remain consistent even when various sections of the first sealing member 18 are removed at the various perforations 108.

Referring now to FIGS. 1-11, having described various aspects of the packaging system 10, a method 400 is disclosed for placing shaped portions 16 of hard ice cream 12 into a wrapper 90. According to the method 400, at least one spherical portion of hard ice cream 12 is disposed onto a first sealing member 18 (step 402). As discussed previously, the first sealing member 18 and the second sealing member 20 can be attached together as a single continuous sheet 100, can be attached to form a tube-shaped or cylindrical container 92, or can be separate members that are placed on top of one another during formation of the various storage cavities 14 of the packaging system 10. According to the method 400, the second sealing member 20 is then pressed on to the first sealing member 18 and at least partially around the at least one spherical portion of hard ice cream 12 to define separate storage cavities 14 for each at least one sphere of hard ice cream 12 (step 404). The first and second sealing members 18, 20 are then sealed together around each at least one shaped portion 16 of hard ice cream 12 to define a sealed strand 24 of shaped portions 16 of hard ice cream 12 (step 406). The first and second sealing members 18, 20 are configured to be releasable from one another so that a user can access, separately and individually, the various shaped portions 16 of hard ice cream 12.

According to the method 400, each at least one shaped portion 16 of hard ice cream 12 is indented to define a concave depression 22 within each at least one shaped portion 16 of hard ice cream 12 (step 408). As discussed previously, the concave depression 22 can be indented within each spherical portion during pressing operation 60 of step 404 discussed above. In various aspects of the device, the concave depression 22 can also be formed within each shaped portion 16 during the formation of each shaped portion 16. A separate indenting step 408 can also be provided after formation of the shaped portion 16 and before the pressing operation 60 of step 404 described herein. According to the method 400, at least one of the first and second sealing members 18, 20 can include a perforating step 410 where perforations 108 are defined at each at least one sphere. In this manner, each storage cavity 14 contains at least one perforated edge 110 that allows for a portion of one of the first and second sealing members 18, 20 to be released from the remainder of the corresponding first and second sealing portion. During release of a particular perforation, a portion of the first sealing member 18 can define an operable flap 130 for accessing each storage cavity 14 of the packaging system 10. After the perforation step 410, the first and second sealing members 18, 20 in the form of a sealed strand 24 can be placed within an outer container 132 (step 412). The outer container 132 can include various nutritional information, trademarks, and other markings useful in identifying the product, flavor, and other details of the shaped portions 16 of hard ice cream 12 contained therein.

Typically, sixteen shaped portions 16 of hard ice cream 12 will be contained within a particular sealed strand 24. Shaped portions 16 of hard ice cream 12 can be in a single elongated sealed strand 24. The shaped portions 16 can also be disposed within an array, where portions of the array can be folded on top of one another to define a more compact shape of the sealed strand 24. Where a more compact shape is desired, the shaped portions 16 can be stacked on top of one another, using the concave depressions 22 and illustrated in a manner substantially similar to that shown in FIG. 5. After packaging, a plurality of sealed strands 24 can be stacked on one another. In such an embodiment, the concave depression 22 of each at least one shaped portion 16 of hard ice cream 12 is configured to receive a vertically adjacent sealed strand 140 and carry a respective shaped portion 16 of hard ice cream 12 within the vertically adjacent sealed strand 140.

Referring now to FIGS. 1-10 and 12, a method 500 is disclosed for placing hard ice cream 12 into a container or wrapper 90 using the packaging system 10. According to the method 500, at least one spherically-shaped portion of hard ice cream 12 is disposed within a tube or cylindrical container 92 that includes first and second sealing members 18, 20 (step 502). According to various aspects of the device, the tube that is defined by the first and second sealing members 18, 20 can include a plurality of perforations 108 that assist in defining the storage cavities 14 for containing the spherically-shaped portions of hard ice cream 12. According to the method 500, the second sealing member 20 is pressed onto the first sealing member 18 in various positions at least around the various spherically-shaped portions of hard ice cream 12 to define separate storage cavities 14 for each at least one spherical portion of hard ice cream 12 (step 504). In such an embodiment, the plurality of perforations 108 includes respective perforated edges 110 that correspond to each respective storage cavity 14. Stated another way, each storage cavity 14 includes at least one perforated edge 110 that allows for removal of any one particular spherically-shaped portion of hard ice cream 12 without disturbing the storage cavities 14 of adjacent spherically-shaped portions of hard ice cream 12. According to the method 500, the first and second sealing members 18, 20 are sealed together and around each spherically-shaped portion of hard ice cream 12 to define a sealed strand 24 (step 506). In the various aspects of the device, the first and second sealing members 18, 20, when sealed together, are configured to be releasable with respect to one another. Each spherically-shaped portion of hard ice cream 12 also goes through an indenting step 508 to define a concave depression 22 within each at least one spherically-shaped portion of hard ice cream 12. The first and second sealing members 18, 20 are then placed within an outer container 132 (step 510).

According to various aspects of the device, hard ice cream 12 is typically used as the frozen food that is stored within the various storage cavities 14 of the packaging system 10. Other food items can be used within the packaging system 10, where such food items can include, but are not limited to, gelato, low-calorie ice cream, various flavors of ice cream, ice cream having additional food items mixed within, sherbet, sorbet, and other similar frozen confections.

According to various aspects of the device, the various shaped portions 16 of hard ice cream 12 disposed within the sealed strand 24 can include a single flavor of ice cream. It is also contemplated that the sealed strand 24 can be separated into sections having different flavors of hard ice cream 12. Other aspects of the device can include a sealed strand 24 having a plurality of different flavors of shaped portions 16 of hard ice cream 12 contained within a single sealed strand 24.

The use of the packaging system 10 described herein provides a more convenient and efficient manner for serving hard ice cream 12 to customers or within a residential setting. Additionally, the packaging system 10 provides for consistent control of serving size 80 by providing consistently sized and shaped portions 16 of hard ice cream 12. The shaped portions 16 of hard ice cream 12 also provide a packaging mechanism where the various shaped portions 16 can be stacked on top of one another using the concave depression 22 defined within each spherical portion.

According to various aspects of the device, the concave depression 22 can serve as a seat 26 for allowing stackability of vertically adjacent spherical portions of hard ice cream 12, either within a particular sealed strand 24 or in stacking for consumption to a customer.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of placing hard ice cream into a container, the method comprising steps of:
   disposing at least one sphere of hard ice cream onto a first sealing member;
   pressing a second sealing member onto the first sealing member and at least partially around the at least one sphere of hard ice cream to define a separate storage cavity for each at least one sphere of hard ice cream;
   sealing the first and second sealing members together around each at least one sphere of hard ice cream to define a sealed strand, wherein the first and second sealing members are releasable;
   indenting each at least one sphere of hard ice cream to define a concave depression within each at least one sphere of hard ice cream; and
   placing the first and second sealing members into an outer container.

2. The method of claim 1, further comprising a step of:
   perforating at least one of the first and second sealing members at each at least one sphere, wherein each perforation defines an operable flap for accessing each storage cavity.

3. The method of claim 1, further comprising a step of:
   stacking a plurality of sealed strands in one another, wherein the concave depression of each at least one sphere of hard ice cream is configured to receive a vertically adjacent sealed strand at a respective at least one sphere of hard ice cream.

4. The method of claim 1, wherein the first and second sealing members define a cylindrical tube that receives each at least one sphere of hard ice cream.

5. The method of claim 1, wherein the first and second sealing members are defined by a single continuous sheet of material that is folded along an axis, wherein the first and second sealing members are divided at the axis of the continuous sheet of material.

6. The method of claim 1, wherein the at least one sphere of hard ice cream is a sphere of approximately 4" in diameter.

7. A method of placing hard ice cream into a container, the method comprising steps of:
   disposing at least one sphere of hard ice cream within a tube that includes first and second sealing members, wherein at least one of the first and second sealing members includes a plurality of perforations;
   pressing the second sealing member onto the first sealing member and at least partially around the at least one sphere of hard ice cream to define a separate storage cavity for each at least one sphere of hard ice cream, wherein the plurality of perforations includes a respective perforation that corresponds to a respective storage cavity;
   sealing the first and second sealing members together around each at least one sphere of hard ice cream to define a sealed strand, wherein the first and second sealing members are releasable; and
   indenting each at least one sphere of hard ice cream to define a concave depression within each at least one sphere of hard ice cream.

8. The method of claim 7, further comprising a step of:
   placing the first and second sealing members into an outer container.

9. The method of claim 7, wherein the at least one sphere of hard ice cream is a sphere of approximately 4" in diameter.

* * * * *